United States Patent [19]
Huang

[11] Patent Number: 5,774,970
[45] Date of Patent: Jul. 7, 1998

[54] MANUFACTURING PROCESS OF A GOLF CLUB HEAD

[76] Inventor: Hui Ming Huang, No. 528, Yow Chang St., Kaohsiung, Taiwan

[21] Appl. No.: 685,523

[22] Filed: Jul. 24, 1996

[51] Int. Cl.$^6$ .................................................. B23P 11/02
[52] U.S. Cl. .................................... 29/447; 473/282
[58] Field of Search ..................... 29/447; 473/282

[56] References Cited

U.S. PATENT DOCUMENTS

| | | | |
|---|---|---|---|
| 4,180,269 | 12/1979 | Thompson | 29/447 |
| 4,338,833 | 7/1982 | Schleffendorf | 29/447 |
| 4,783,893 | 11/1988 | Farino | 29/447 |
| 5,280,674 | 1/1994 | Granger et al. | 29/447 |
| 5,407,202 | 4/1995 | Igarashi | 273/169 |

*Primary Examiner*—James F. Coan
*Assistant Examiner*—Gene L. Kim
*Attorney, Agent, or Firm*—David & Raymond; Raymond Y. Chan

[57] ABSTRACT

A manufacturing process of a golf club head for tightly and firmly affixing a striking plate, which is preferably made of titanium or titanium alloy, on a head body made of other metal material includes the following steps of (1) forming a receiving groove on a head body of a golf club which has a predetermined original size and shape; (2) heating the head body until the head body expands to slightly enlarge the size of the receiving groove; (3) planting a striking plate, which is made of titanium or titanium alloy and has a size and shape slightly larger than the original size and shape of the receiving groove of the head body before heating, into the heated receiving groove of the head body; and (4) moving the head body with the striking plate to room temperature until the receiving groove will shrink back to the original size. Therefore, the striking plate is tightly and firmly engaged within the receiving groove so as to integrally attach with the head body to form the one body golf club head, so that the chance of the looseness of the striking plate from the head body would be eliminated.

2 Claims, 1 Drawing Sheet

5,774,970

MANUFACTURING PROCESS OF A GOLF CLUB HEAD

BACKGROUND OF THE PRESENT INVENTION

The present invention relates to a golf club head, and more particularly to a manufacturing process of a golf club head having a titanium or titanium alloy striking plate incorporated thereon, in which the striking plate can be tightly engaged with the head body of the golf club head without incorporated with any connecting element so that the chance of loosening would be eliminated.

Due to the improvement of material technology, the golf club is improved from a metal made product to a lighter and more elastic carbon fiber made product. Moreover, the golf head of the golf club also is preferable to be made by light material. However, since the golf head of the golf club is used to impact the golf ball, the golf head must also be constructed to have high rigidity and durability. Titanium or titanium alloy is an ideal material of the golf head.

However, the cost of the titanium or titanium alloy is too expensive, therefore, a titanium or titanium alloy made striking plate which has a striking surface for hitting the golf ball is mounted to the golf head made of other cheaper light material, so that the total manufacturing cost of the golf club can be highly reduced. Common connection means for attaching the titanium or titanium alloy striking plate onto the golf head includes screwing, pining, gluing, and welding.

Among various conventional connection means as mentioned above, welding is considerable to be a better method for better impacting result but, due to the limitation of the welding material, the welding method may not be applied to all materials. Therefore, in order to integrally connect two unweldable or low fusing materials, the second choice for connection methods, such as screwing, pining or gluing, has to be used for attaching the striking plate onto the golf head. However, such conventional connecting methods such as screwing, pining and gluing bear a common drawback that, if the screwing, pining or gluing treatment processes under any minor careless operation or the quality of the materials selected for the connecting element, such as screws, pins or adhesive glue, the striking plate or the golf head is not up to a certain standard, the striking plate may become loose or even break apart with the golf head sooner or later.

SUMMARY OF THE PRESENT INVENTION

The main object of the present invention is to provide a manufacturing process of a golf club head which can firmly, tightly and integrally affix a striking plate on a golf head body of the golf club for better solid strike with a golf ball and ensuring the striking plate would not loosen or break apart from the head body.

Accordingly, a manufacturing process of a golf club head of the present invention for tightly and firmly affixing a striking plate, which is preferably made of titanium or titanium alloy, on a head body made of other metal material. The manufacturing process comprises the following steps of (1) forming a receiving groove on a head body of a golf club which has a predetermined original size and shape, (2) heating the head body until the head body expands to slightly enlarge the size of the receiving groove, (3) planting a striking plate, which is made of titanium or titanium alloy and has a size and shape slightly larger than the original size and shape of the receiving groove of the head body before heating, into the heated receiving groove of the head body, and (4) moving the head body with the striking plate to room temperature until the receiving groove will shrink back to the original size, so that the striking plate is tightly and firmly engaged within the receiving groove so as to integrally attach with the head body to form the one body golf club head.

DETAILED DESCRIPTION OF THE PREFERRED EMBODIMENT

Figure 1:
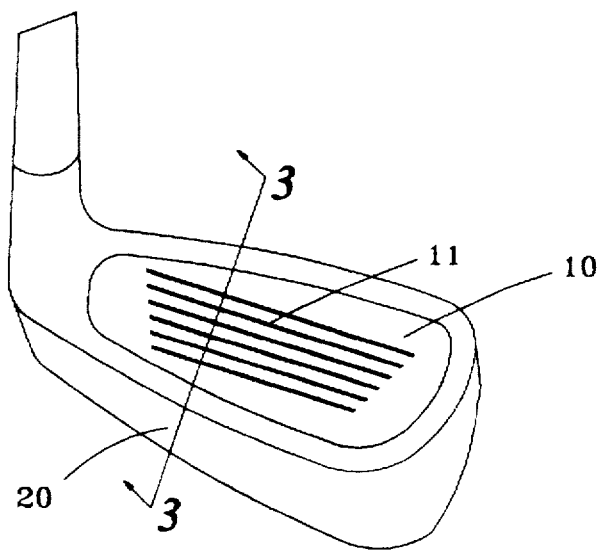
FIG. 1 is a perspective view of a golf club head manufactured by a manufacturing process according to a preferred embodiment of the present invention.
Figure 2:
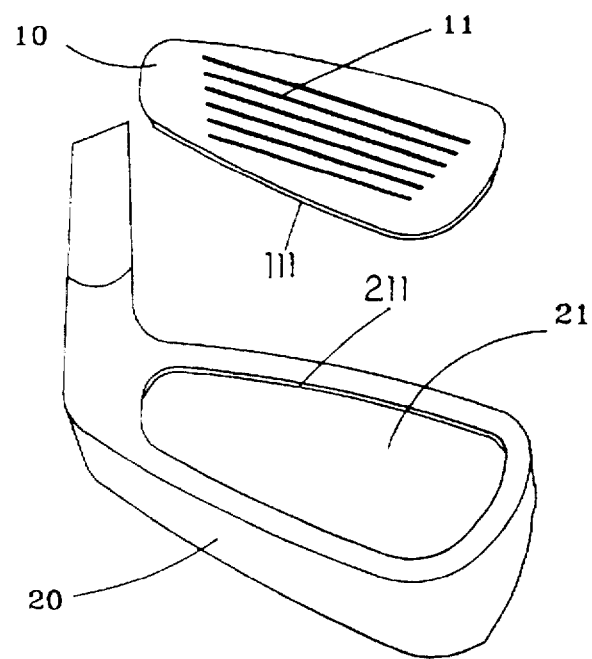
FIG. 2 is an exploded view of the golf club head as shown in FIG. 1.
Figure 3:
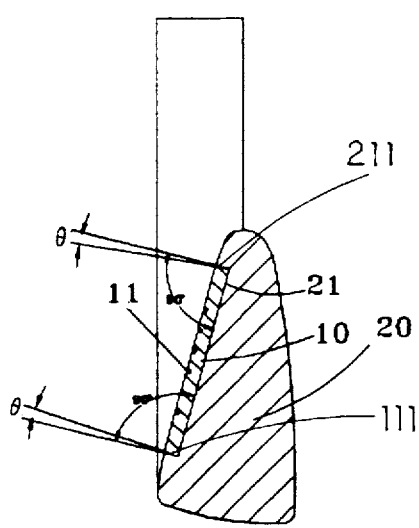
FIG. 3 is a sectional view of line 3—3 of FIG. 1.

Referring to FIGS. 1 to 3, a manufacturing process of a golf club head having a metal striking plate incorporated comprises the following steps:

(1) Finish a striking plate 10 by a CNC lathe to form a golf ball striking surface with a plurality of scoring lines 11 thereon, in which a periphery side 111 of the striking plate is shaped in flat or slightly taper (inclined) manner.

(2) Form a receiving groove 21 on a striking flat surface of a head body 20 by the CNC lathe, in which the receiving groove 21 has a shape of the striking plate, a reverse taper periphery side 211 having an inclined angle of preferable 1 to 3 degree, a depth equal to a thickness of the striking plate 10, and a room temperature original size which is slightly smaller than the size of the striking plate 10. In the other words, the tolerance fitting relationship between the striking plate 10 and the receiving groove 21 on the head body 20 should be in the following fitting condition, including wringing fit or tight fit (just like medium force fit) and heavy force or shrink fit, so that during room temperature, the striking plate 10 can not be planted into the receiving groove 21 or removed from the receiving groove 21.

(3) Heat the head body 20 having the receiving groove 21 under gradually raising temperature from room temperature for predetermined expansion in volume so that, the size of the receiving groove 21 is enlarged gradually according to the raising temperature until the head body is heated to a predetermined heating temperature that the size of the striking plate 10 matches with the size of the receiving groove 21 to enable an adequate snug fit, or medium fit (just like free fit), loose fit of the striking plate 10 with the receiving groove 21. Then, maintain the heating temperature at this stage.

(4) Plant the striking plate 10 into the receiving groove 21 of the heated head body 20 which volume has expand due to the heat treatment. At this stage, the size of the receiving groove 21 due to the heat treatment expansion is already larger than the size of the striking plate 10, in which the tolerance fitting relationship between the striking plate 10 and the receiving groove 21 has changed from the wringing fit or tight fit to below the snug fit or medium fit, so that the striking plate 10 can be easily planted into the receiving groove 21 of the head body 20 for connecting together.

(5) Move the head body 20 and the striking plate 10 which is planted in the receiving groove 21 to room temperature area for cooling the head body 20 to room temperature, so that the receiving groove 21 of the head body 20 shrinks back to its room temperature original size. When the receiving groove 21 of the head body 20 is cooled to room temperature, the fitting relationship between the striking plate 10 and the receiving groove 21 becomes the wringing fit or tight fit condition so that the reverse taper periphery side 211 of the receiving groove 21 would tightly engage with the periphery side 111 of the striking plate 10 for holding the striking plate 10 firmly and tightly in position so as to form an integral golf club head.

The heating temperature of the head body in the above step (3) depends on the heat treatment characteristics and features of the head body. If the rate of heat expansion of the head body is small, then the heat treatment temperature need to be higher. However, the heating temperature of the heat treatment must also be controlled within a certain limit to retain the material properties. For example, the 18-8 stainless steel material contains 18% of chromium, 8% of nickel, the heat treatment temperature should be about 500 degree Celsius in order to avoid any structural change and inter granular corrosion which is caused by overheating and may lead to inter granular cracking. Accordingly, the suitable heating temperature of the heating treatment of any metal material depends on the specific material property thereof.

Referring to FIG. 2 and FIG. 3, in accordance with the present invention, since the striking plate 10 is finished by CNC lathe to form the flat or slightly taper periphery side 111. In addition, the receiving groove 21 of the head body 20 has the same periphery shape of the striking plate 10 and forms the reverse taper periphery side 211. Accordingly, the golf club head manufactured by the present invention has its striking plate 10 attached to the head body 20 in a firm and tight condition as shown in FIG. 3, in which the striking plate 10 can be firmly and tightly engaged by the receiving groove 21, and be limited by the reverse taper periphery side 211 of the receiving groove 21. Also, since the fitting mode of the striking plate 10 and the receiving groove 21 is in wringing fit condition, the looseness or break apart of the striking plate 10 from the head body 20 would for sure not happen even when the golf club is swinging.

What is claimed is:

1. A manufacturing process of a golf club head having a head body comprising a plurality of steps of:

(a) finishing a striking plate to form a golf ball striking surface and a periphery side, wherein said periphery side of said striking plate is shaped in flat manner;

(b) forming a receiving groove on a striking flat surface of said head body, in which said receiving groove has a shape of said striking plate, a reverse taper periphery side, a depth equal to a thickness of said striking plate, and a room temperature original size which is slightly smaller than a size of said striking plate, and that said reverse taper periphery side has an inclined angle of 1 to 3 degree, said size of said striking plate and said size of said receiving groove defining a tolerance fitting relationship therebetween, in which said striking plate and said receiving groove on said head body is in a wringing fit condition, so that said striking plate is unable to be planted into said receiving groove during room temperature;

(c) heating said head body having said receiving groove under gradually raising temperature from room temperature for expansion so that said size of said receiving groove is enlarged gradually until said head body is heated to a predetermined heating temperature so that said size of said striking plate becomes slightly smaller than said size of said receiving groove to enable said striking plate to be inserted into said receiving groove, and then maintaining said heating temperature;

(d) planting said striking plate into said receiving groove of said heated head body, at this stage, said size of said receiving groove being expanded to be slightly larger than said size of said striking plate, wherein said tolerance fitting relationship between said striking plate and said receiving groove has changed from said wringing fit to a snug fit condition for enabling said striking plate to be easily planted into said receiving groove of said head body; and (e) cooling said head body and said striking plate which is planted in said receiving groove to a room temperature, so that said receiving groove of said head body shrinks back to said room temperature original size, at this stage, said fitting relationship between said striking plate and said receiving groove returning to said wringing fit condition and said reverse taper periphery side of said receiving groove being tightly engaged with said periphery side of said striking plate for holding said striking plate firmly and tightly in position so as to form said integral golf club head.

2. A manufacturing process as recited in claim 1 wherein said striking plate is made of titanium alloy.

* * * * *